United States Patent [19]

Heehler, deceased et al.

[11] 3,908,179

[45] Sept. 23, 1975

[54] COMBINATION WARNING LIGHT AND EMERGENCY FLASHER APPARATUS

[75] Inventors: Arthur C. Heehler, deceased, Late of Park Ridge, Ill, by Robert I. Gustafson, executor, Chicago, Ill., Natl. Bank of Austin; Terry O'Neill, Delavan, Wis.

[73] Assignee: Mercor Corporation, Franklin Park, Ill.

[22] Filed: Aug. 7, 1974

[21] Appl. No.: 495,418

[52] U.S. Cl. .................. 340/81 R; 340/50; 240/7.15
[51] Int. Cl.² ...................... B60Q 1/46; B61L 29/24
[58] Field of Search ............ 340/47, 50, 83, 81, 89, 340/92; 240/7.12, 7.15

[56] References Cited
UNITED STATES PATENTS

| | | | |
|---|---|---|---|
| 2,784,388 | 3/1957 | King et al. | 340/50 X |
| 3,441,906 | 4/1969 | Neilsen | 340/83 |
| 3,514,752 | 5/1970 | Lurkis | 340/50 X |
| 3,517,384 | 6/1970 | Jablonski | 340/83 |

*Primary Examiner*—Donald J. Yusko
*Attorney, Agent, or Firm*—Hill, Gross, Simpson, Van Santen, Steadman, Chiara & Simpson

[57] ABSTRACT

A combination warning light and emergency flasher apparatus includes a pair of white light projecting means, cooperatively mounted on a housing such that the beam of light projected by each light projecting means is in an opposing "off-center" downward direction, and an emergency light projecting means having a red translucent lens covering. A control circuit includes an electronic triggering means operable to selectively cause either the pair of white light projecting means to alternately flash bright and dim or cause the second emergency light projecting means to flash bright and dim.

8 Claims, 5 Drawing Figures

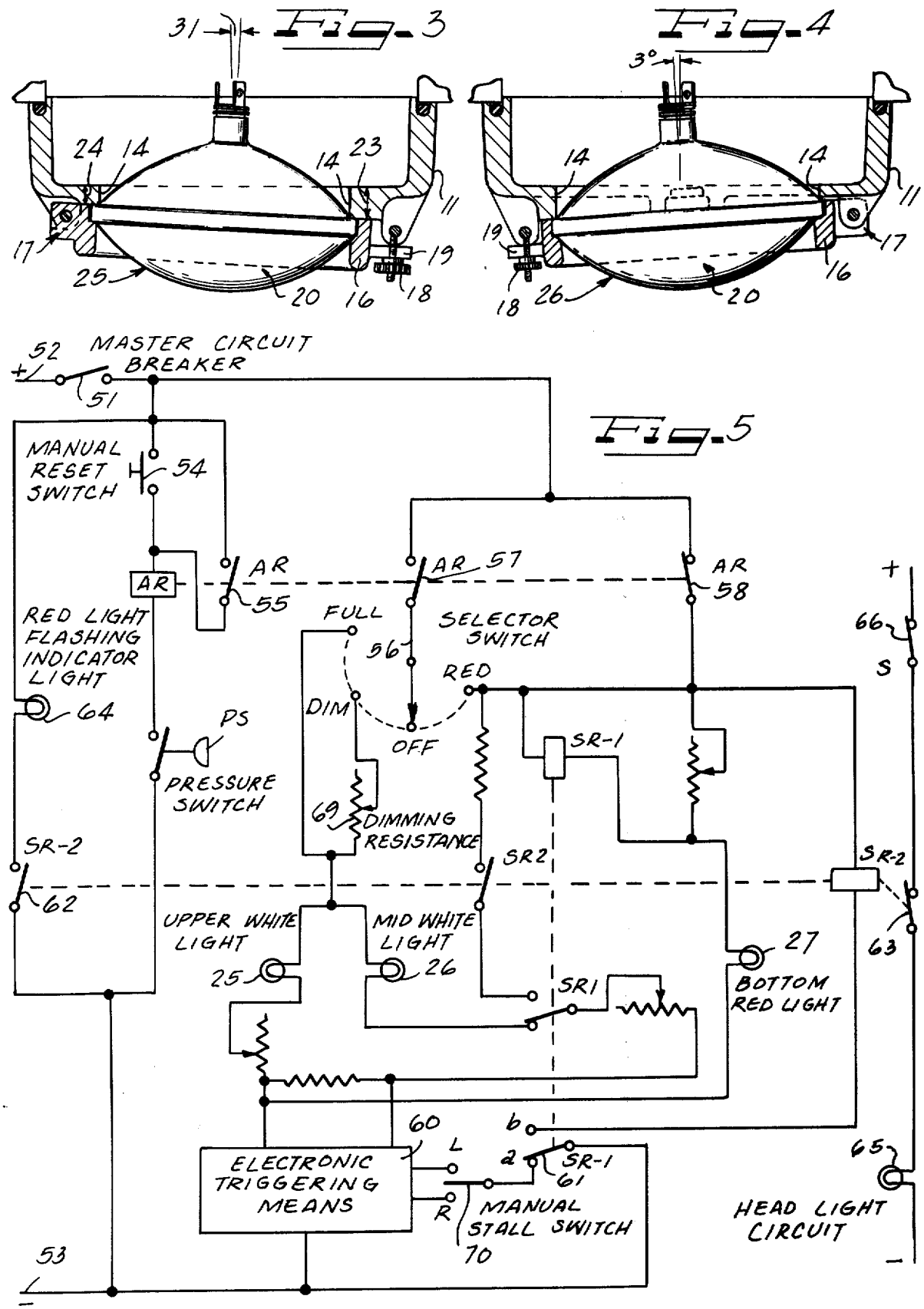

3,908,179

COMBINATION WARNING LIGHT AND EMERGENCY FLASHER APPARATUS

BACKGROUND OF THE INVENTION

1. Field of the Invention

This invention relates to warning lights, and more particularly, to a novel combination warning light and emergency flasher.

2. Description of the Prior Art

Generally, warning lights on locomotives were thought to have a greatly enhanced effect if the source of light was mounted on a gyrating carriage such that the beam of illumination was caused to continuously sweep across the path of traverse in an elliptical pattern. Such a device was disclosed in U.S. Pat. No. 2,677,121 which utilized a motor to drive an eccentrically mounted source of light in the desired elliptical pattern.

While the disclosure of U.S. Pat. No. 2,677,121 provided a highly successful warning light device, it was inherently expensive to manufacture because of the intricate relationship between various eccentric components and the need for a motorized source of power to drive the source of light in the desired pattern. In addition, the various components required precise assembly and adjustment to insure that the desired elliptical pattern of the light beam would be established at the proper range and position in the path of the locomotive.

SUMMARY OF THE INVENTION

A combination warning light and emergency flasher for locomotives and other vehicles, according to the present invention, comprises a housing having a flat surface, an outer side wall around the edge of said flat surface and a plurality of spaced circular openings along the length of said flat surface, at least a pair of white light sources mounted within said circular openings secured in place by a circular retaining ring detachably connected to said housing, an emergency light source also mounted within one of said circular openings held in place by a circular retaining ring detachably connected to said housing and having an outer red translucent lens. Said pair of white light sources are mounted in a mirrored symmetrical fashion such that said first light source projects a beam of light downward and to the left of the path of traverse and the second light source projects a beam of light downward and to the right of the directional movement of the vehicle, and a control circuit is provided having a manual mode operable to selectively alternate illumination of said pair of light sources in rapid succession, or operate said red-lensed emergency light source in a flashing mode, and an automatic mode responsive to the brake line pressure operable to override all manual functions including conventional headlights and illuminate said red-lensed emergency light source.

BRIEF DESCRIPTION OF THE DRAWINGS

Other objects, features and advantages of the invention, together with its organization, construction and operation will be best understood from the following detailed description of the preferred embodiments of the invention, taken in conjunction with the accompanying drawings, on which:

FIG. 3 is a side elevational view taken along lines III—III of FIG. 1.

FIG. 4 is a side elevational view taken along lines IV—IV of FIG. 1.

FIG. 5 is a schematic circuit diagram showing the control circuit provided in accordance with the principles of the present invention.

DESCRIPTION OF THE PREFERRED EMBODIMENTS

Figure 1:
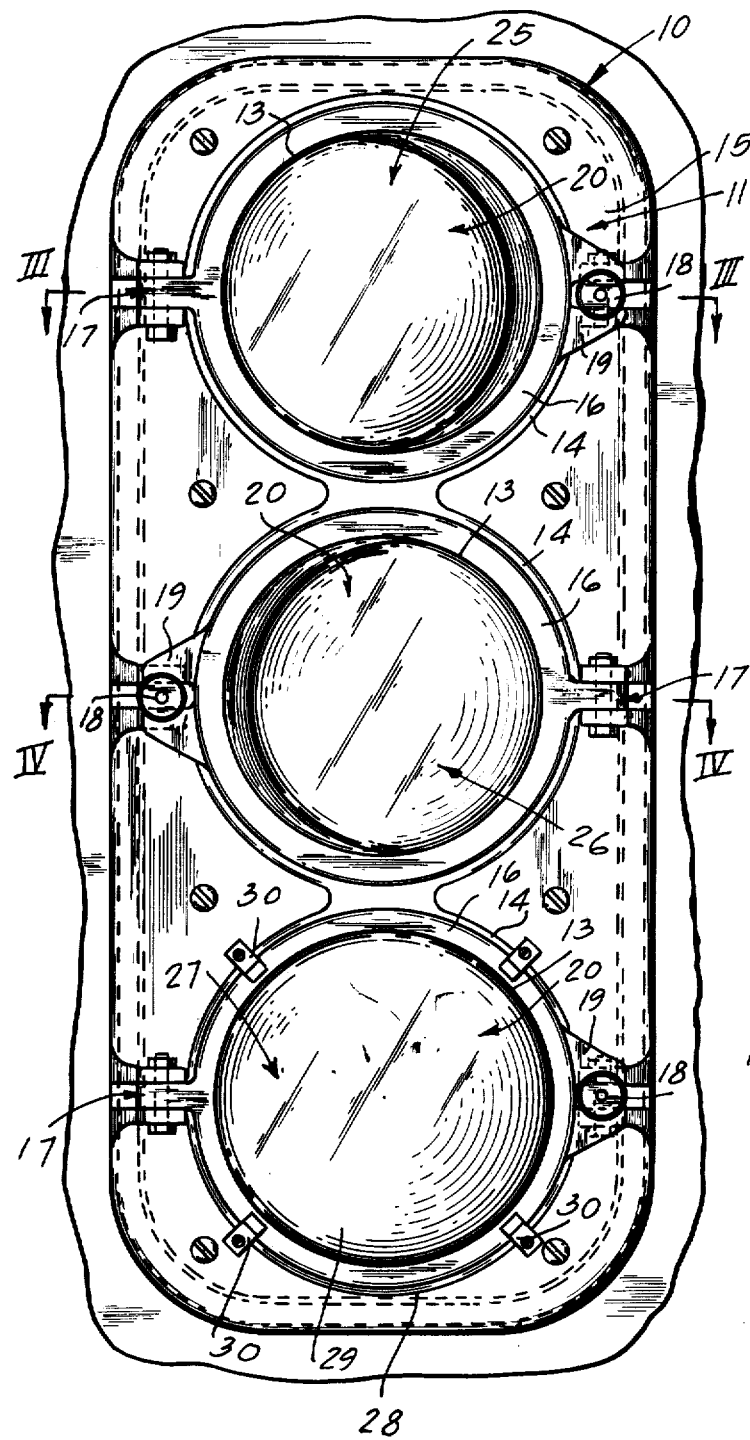
FIG. 1 is a pictorial frontal diagram of the combination warning light and emergency flasher constructed in accordance with the principles of the present invention.
Figure 2:
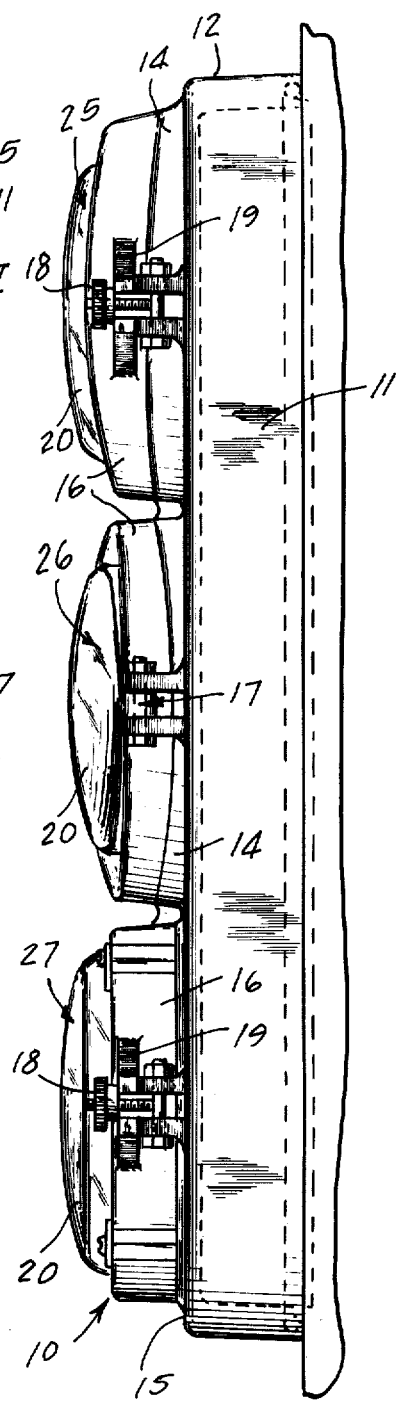
FIG. 2 is a pictorial side view of the combination warning light and emergency flasher constructed in accordance with the principles of the present invention.

Referring to FIGS. 1 and 2, a combination warning light and emergency flasher indicated generally by the reference numeral 10 includes a housing 11 having a flat surface 15 and a side wall 12 downwardly extending around the edge of the housing 11 and a plurality of spaced circular openings 13 along the length of the housing 11. Around the edge of each circular opening 13 is a retaining ring seat 14. Pivotally mounted on the flat surface 15 of the housing 11 is a retaining ring 16 for each circular opening 13. Each retaining ring 16 is pivotally mounted by means of a hinge 17 and latchable in a closed position by means of a latch stud 18 carried on the flat surface 15 of the housing 11 and a slotted boss 19 carried on each retaining ring 16. Each retaining ring seat 14 has a plurality of radially spaced positioning means (not shown) which mate with identically spaced studs (not shown) on the sealed beam light sources 20. Each circular opening is provided with a light source 20 and secured in place after aligning the positioning means of the seat 14 with the studs on the light sources by closing the retaining rings 16 and tightening the latch stud 18 on the slotted boss 19. A suitably formed gasket (not shown) is carried on each retaining ring 16 and cooperates with the edge of the retaining ring seat 14, the retaining ring 16 and the light source 20 to promote a sealing fit between the retaining ring seat 14, the light source 20 and the retaining ring 16.

The light source 20 of the emergency flasher light 27 is mounted on a retaining ring seat which is uniform in thickness and has an outer surface 28 which lies in a plane parallel to that of the flat surface 15. A red translucent lens 29 is attached by a plurality of retaining clips 30 to the retaining ring over the light source 20 to provide a red color to the illuminating beam indicating an emergency condition. Thus, when the emergency flasher light 27 is made operable by the control circuitry, the red pulsating beam of illumination will be directly in the path of the locomotive resulting in optimum visibility to approaching trains.

Referring to FIG. 3, the cross sectional view of the retaining ring seat 14 varies in thickness as noted by cross sectional thickness at 23 and the cross sectional thickness indicated at 24. FIG. 3 represents the warning light 25 on FIG. 1. FIG. 4 represents the warning light 26 on FIG. 1. The circular thickness variations of the retaining ring seat in FIG. 4 of the warning light 26 are the same as the circular thickness variations of the warning light 25 displaced in a mirrored fashion to the opposite side of a parallel plane running perpendicular to the flat surface 15 and through the center of each spaced opening 13.

The result of the circular thickness variations of the retaining ring seat for warning lights 25 and 26 is that the beam of illumination of warning light 25 is directed slightly downwardly and slightly to the right of an imaginary line drawn perpendicular to the flat surface 15 of the housing representing the directional movement of the locomotive. The warning light 26 projects a beam of illumination in a mirrored fashion to that of the warning light 25 on the opposite side of the imaginary line.

Experimentation with different seal beam light sources in combination with various settings in the circular thickness variations of the retaining ring seat has resulted in an optimum pitch angle of 3°, as indicated by numeral 31 in FIG. 3, whereby the light source is pitched 3°, to the side from a line drawn perpendicular to the flat surface 15 of the housing 11. A similar 3° pitch is provided for the warning light 26, as shown in FIG. 4, but to the opposite side of the perpendicular line from that of warning light 25.

Given the orientation of warning lights 25 and 26 as described above, when the control circuit, as will be explained later, is operable to alternately flash the warning lights 25 and 26 from bright to dim, the combined beam patterns will result in an "eye-catching" effect and greatly enhance the apparatus as a warning light.

In FIG. 5, the control circuit for the improved combination warning light and emergency flasher structure of the present invention is shown in a schematic circuit diagram. The control system of the present invention is particularly useful when the warning light and emergency flasher apparatus 10 is installed upon a movable vehicle, such as a railway locomotive or the like, there being in addition a regular headlight 65. Also, for purposes of simplicity, the operation of the control circuit will be explained with reference to the front end of a vehicle, moving in a forward direction, it being understood that a similar regular headlight, warning light and emergency flasher apparatus 10 and control circuit could be provided at the other end.

Initially, it is to be noted that the control circuit shown in FIG. 5 incorporates the use of two series relay units indicated by the reference numerals SR-1 and SR-2. In addition, an automatic relay coil, indicated by reference character AR, is placed in series with a pressure-responsive switch PS, preferably connected in operative relationship with the air brake line of a locomotive or some other pressure system whereby an emergency condition may be detected through variations in air pressure.

The various contacts operated by the respective relay coils will be identified by suitable reference numerals prefixed by the reference characters used in identifying the relay coils. The relay contacts are shown in their normal positions when the relays are deenergized. The manually-operated and air-operated switches are shown in their "off" positions.

To energize the control circuit, a master circuit breaker switch 51 is closed so that the control circuit will be directly connected to a suitable source of direct current, the source of current being identified by conventional positive and negative symbols 52 and 53, respectively.

At this initial stage, the selector switch 56 is not functional due to the contact AR-57 being in an open condition. However, the contact AR-58 being normally closed when the coil AR is deenergized will result in current flowing to energize the sealed beam red emergency lamp 27 which in turn has the ground terminal connected to the electronic triggering means 60. The result being that the lamp 27 will commence flashing at a rate of approximately 50 cycles per minute due to the triggering means 60 alternately opening and closing the ground terminal. The operation and design of the electronic triggering means 60 is well known by those skilled in the art and no discussion of the internal circuitry will be included in the present discussion.

It will also be noted that by initially energizing the control circuit, the relay coil SR-1 will be energized resulting in the relay contact SR-1 61 shifting from terminal SR-1a to terminal SR-1b. As a result thereof, current will flow through the relay coil SR-2 which in turn will cause the relay contact SR-2 62 to close and relay contact SR-2 63 to open. The relay contact SR-2 62 is placed in series with the indicator light 64 which is located in the cab of the locomotive. Thus, it can be seen that when the red energizing lamp 27 is flashing, the indicator light 64 will be energized to indicate the functioning of the lamp 27. Moreover, if the sealed beam lamp 27 burns out, the circuit through the relay coil SR-2 will in turn be broken, thereby opening the contact SR-2 62 and extinguishing the indicator light 64. By this arrangement, the indicator light 64 not only indicates that the apparatus is "flashing red," but provides a ready indication if the sealed beam lamp 27 is burned out.

The significance of the relay contact SR-2 63 opening when the relay coil SR-2 is energized is that the regular headlight 65 of the locomotive is rendered inoperative whenever the flashing red emergency light 27 is operating. This feature greatly enhances the visibility of the red emergency light.

At this stage, the regular headlight 65 can be switched on by a switch 66. The headlight, of course, will not be energized because of the open position of the relay contact SR-2 63. Selector switch 56 is then moved to the "full" position. Neither the regular headlight 65 nor sealed beam white warning lights 25 and 26 will be operating at this point.

When the brake line pressure achieves a predetermined level, pressure switch PS will close. This is followed by manually closing the reset switch 54 which results in the relay coil AR being energized. The relay contact AR-55 is arranged to by-pass the relay coil AR so that the coil AR will have a self-holding effect, once energized. It is also noted that the relay contact AR-57 is closed and the relay contact AR-58 is opened, which in turn deenergizes the relay coils SR-1 and SR-2, resulting in the energizing of the regular headlights 65 and the extinguishing of the flashing red light 27, as well as the indicator light 64.

The ground terminal of each white warning light 25 and 26 is connected to the electronic triggering means 60 which results in the lights 25 and 26 cooperatively flashing on and off at a rate of approximately 50 cycles per minute.

It will be noted that a dimming resistance 69 is placed in series with the energizing current flow to the warning lights 25 and 26 when the selector switch 56 is shifted to the "dim" position. The ability to dim the flashing warning lights 25 and 26 is particularly advantageous when another train is approaching on a parallel track.

A manual stall switch 70 is provided in the cab of the locomotive to permit a manual override on the electronically operated triggering means 60. As shown, the manual stall switch 70 has a normally open position and two momentary contacts L and R. L corresponds to the warning light angled to the left of the directional movement of the vehicle and R corresponds to the light angled to the right. By manually closing the switch 70 to either L or R, the engineer may illuminate the desired area to the side of the directional movement of the locomotive. This feature is particularly advantageous when the locomotive is rounding a long, continuous bend to enable the engineer to effectively illuminate the path.

An automatic mode of the control circuit is invoked at any time the line pressure drops below the predetermined level. When this occurs, pressure switch PS will open, causing the relay coil AR to become deenergized. This in turn cuts out the selector switch 56, and energizes the emergency red flashing lamp 27. Thus, the control circuit has, in addition to its manual operation, an automatic mode as well.

Although the present invention has been described by reference to particular illustrative embodiments thereof, the illustrations and descriptions have only been provided as non-limiting examples. Many changes and modifications of the invention may become apparent to those skilled in the art without departing from the spirit and scope of the invention. It is, therefore, intended that the patent warranted hereon cover all such changes and modifications as may reasonably and properly be included within the scope of the contribution to the art.

We claim as our invention:

1. In a warning light apparatus for mounting on a vehicle consisting of:
   a rectangular housing having a flat surface and a longitudinal axis extending along the length of said housing,
   at least a pair of light mounting seats located along said longitudinal axis of said flat surface,
   a first and a second light source rigidly mounted on said light mounting seats along said longitudinal axis,
   said first light source oriented to project a beam of illumination downward and to the side of an imaginary line drawn perpendicular to said longitudinal axis of said flat surface,
   said second light source oriented to project a beam of illumination downward and to the opposite side of said perpendicular line in a mirrored relationship to said beam of illumination of said first light source,
   a circuit means operable to continuously flash said first and second light sources from a fully illuminated condition to a dim condition.

2. A warning light apparatus according to claim 1, further comprising a manual stall switch in operable relationship to said circuit means, whereby either of said first or second light sources can be fully illuminated.

3. A warning light apparatus according to claim 2, further comprising a dimmer resistance selectively placed in series with said first and second light sources functioning to reduce the illumination of said first and second light sources when a second vehicle is approaching from the opposite direction.

4. A combination warning light and emergency flasher for mounting on a vehicle such as a locomotive, consisting of:
   a rectangular housing having a flat surface and a longitudinal axis extending along the length of said housing,
   a plurality of light mounting seats located along said longitudinal axis of said flat surface,
   a first and a second white light source rigidly mounted adjacent each other on two said light mounting seats along said longitudinal axis,
   said first white light source oriented to project a beam of illumination downward and to the side of an imaginary line drawn perpendicular to said longitudinal axis of said flat surface,
   said second white light source oriented to project a beam of illumination downward and to the opposite side of said perpendicular line in a mirrored relationship to said beam of illumination of said first light source,
   a third emergency light source mounted on a third light mounting seat operable to project a colored beam of illumination in a parallel relationship to said longitudinal axis of said flat surface, and
   a circuit means operable to selectively alternate said first and second white light sources from a fully illuminated condition to a dim condition, or flash said third emergency light source from a fully illuminated condition to a dim condition.

5. A combination warning light and emergency flasher according to claim 4, further comprising a manual stall switch in operable relationship to said circuit means, whereby either of said first or second light sources can be fully illuminated.

6. A combination warning light and emergency flasher according to claim 5, further comprising a dimmer resistance selectively placed in series with said first and second white light sources functioning to reduce the illumination of said first and second white light sources when a second vehicle is approaching from the opposite direction.

7. A combination warning light and emergency flasher according to claim 4, further comprising a circuit means in operable relationship to the conventional headlights of the vehicle to automatically extinguish said conventional headlights whenever said third emergency light source is in an energized condition.

8. A combination warning light and emergency flasher according to claim 4, further comprising a pressure switch responsive to a predetermined level of brake line pressure of a vehicle and in operable relationship to said circuit means to extinguish all sources of white light and energize said third emergency light source.

* * * * *